April 18, 1944. J. F. LOTSPEICH 2,346,980
NUT CRACKING MACHINE
Filed Sept. 8, 1941 5 Sheets-Sheet 3

Joseph F. Lotspeich
INVENTOR
BY Victor J. Evans & Co.
ATTORNEYS

April 18, 1944.  J. F. LOTSPEICH  2,346,980
NUT CRACKING MACHINE
Filed Sept. 8, 1941  5 Sheets-Sheet 4
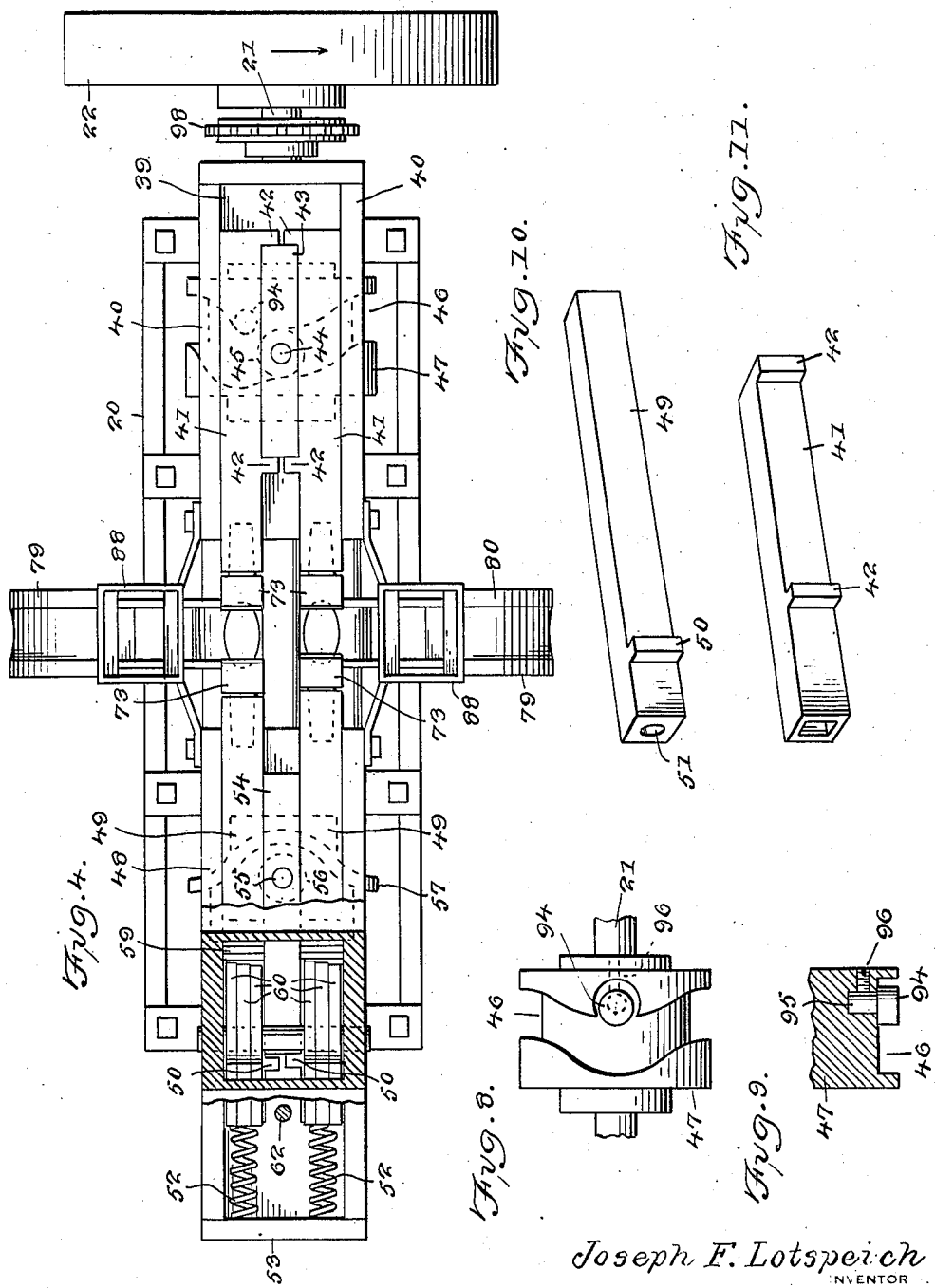
Joseph F. Lotspeich
INVENTOR
BY Victor J. Evans & Co.
ATTORNEYS

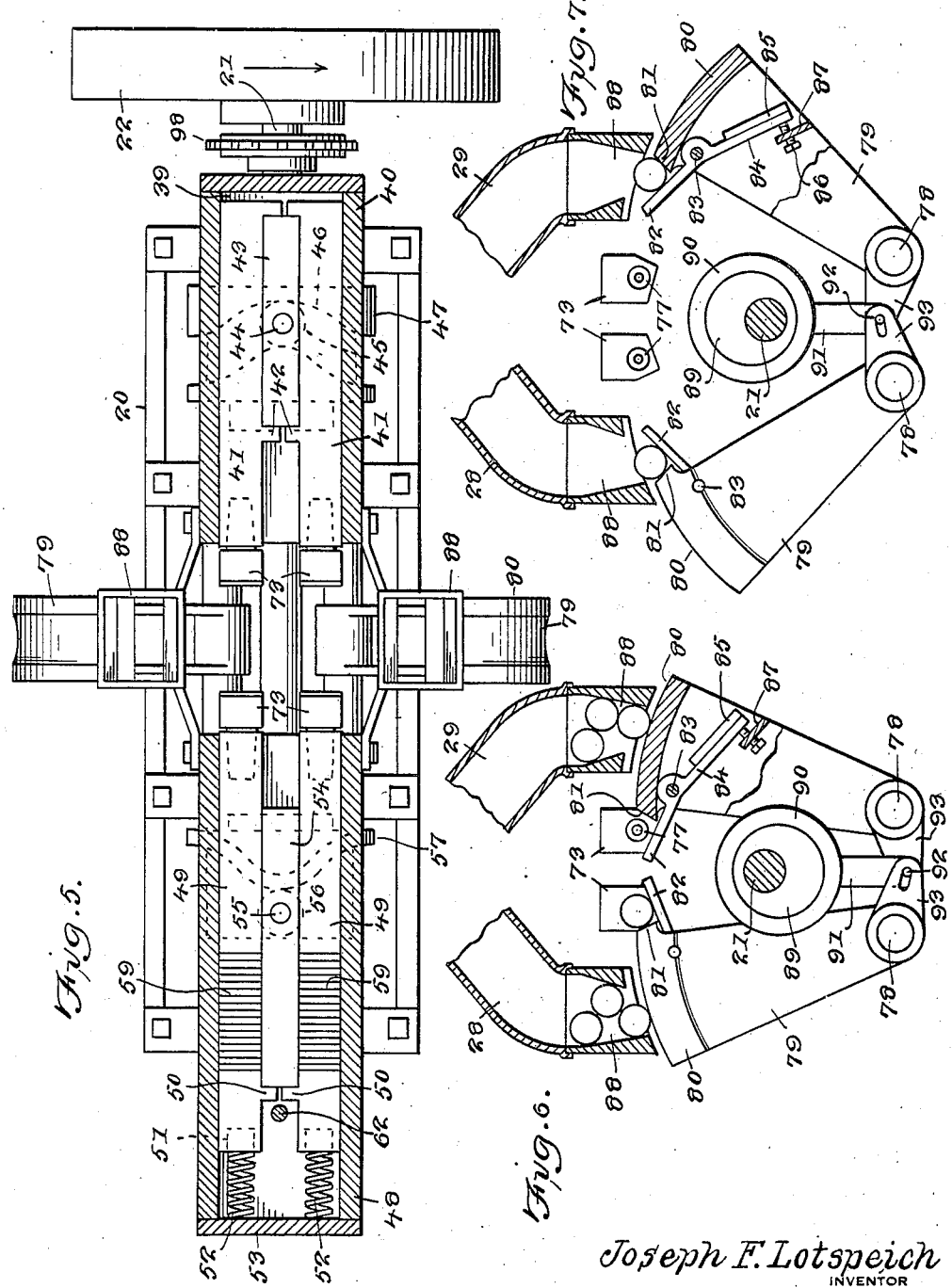

Patented Apr. 18, 1944

2,346,980

UNITED STATES PATENT OFFICE 2,346,980

NUTCRACKING MACHINE

Joseph F. Lotspeich, San Antonio, Tex., assignor to Southern Pecan Shelling Company, a partnership composed of J. Seligmann, Grace Seligmann, Joe Freeman, Harold M. Freeman, Emma Freeman, Clarence S. Freeman, Joe Rubin, Martye Rubin, Alex Pomerantz, Sera Pomerantz, Jane Enid Strauss, and J. Seligmann, Jr.

Application September 8, 1941, Serial No. 410,060

2 Claims. (Cl. 146—12)

The present invention relates to improvements in nut cracking machines and has particular reference to a machine operable to simultaneously crack two nuts of the pecan type.

An object of the invention is to provide a nut cracking machine of generally improved construction.

Another object of the invention is the provision of a nut cracking machine which is rapid and highly efficient in operation.

A further object of the invention is the provision of a nut cracking machine which will effectively crack the nuts without crushing or unduly mutilating the same.

Still another object of the invention is the provision of a nut cracking machine which is durable in construction and reliable in operation.

Other objects and advantages will be apparent from the following description and appended claims.

Figure 1:
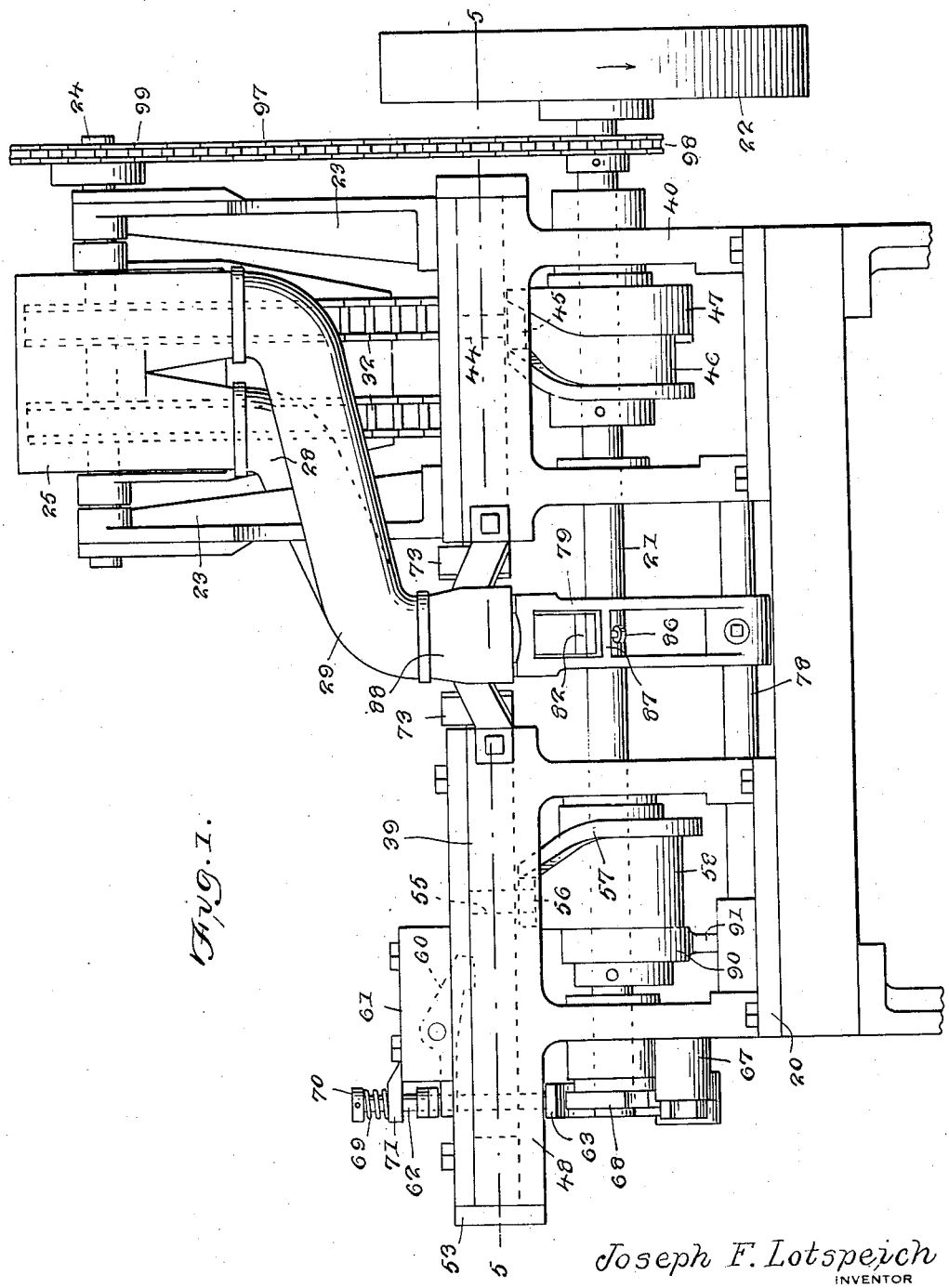
Figure 2:
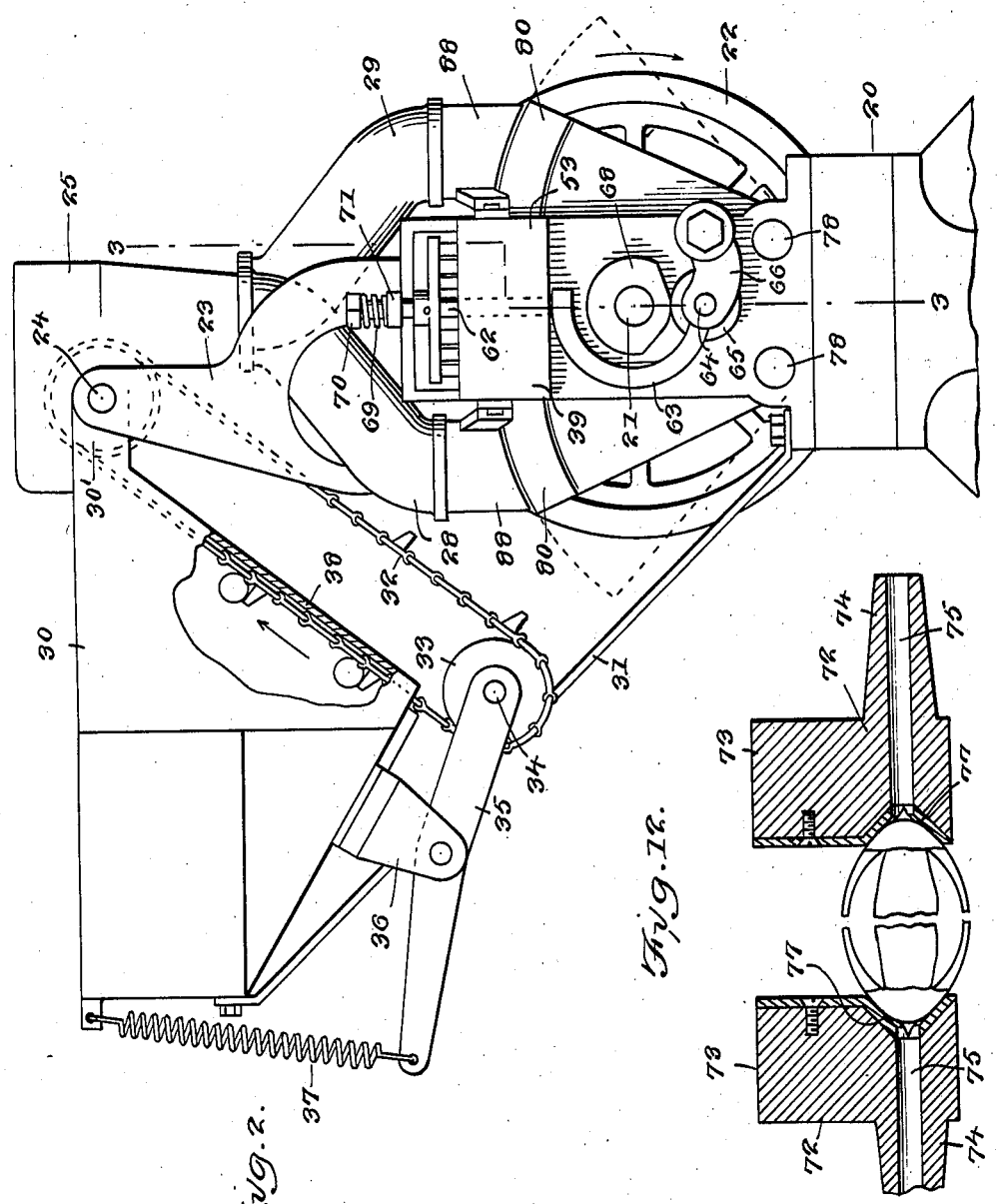
Figure 3:
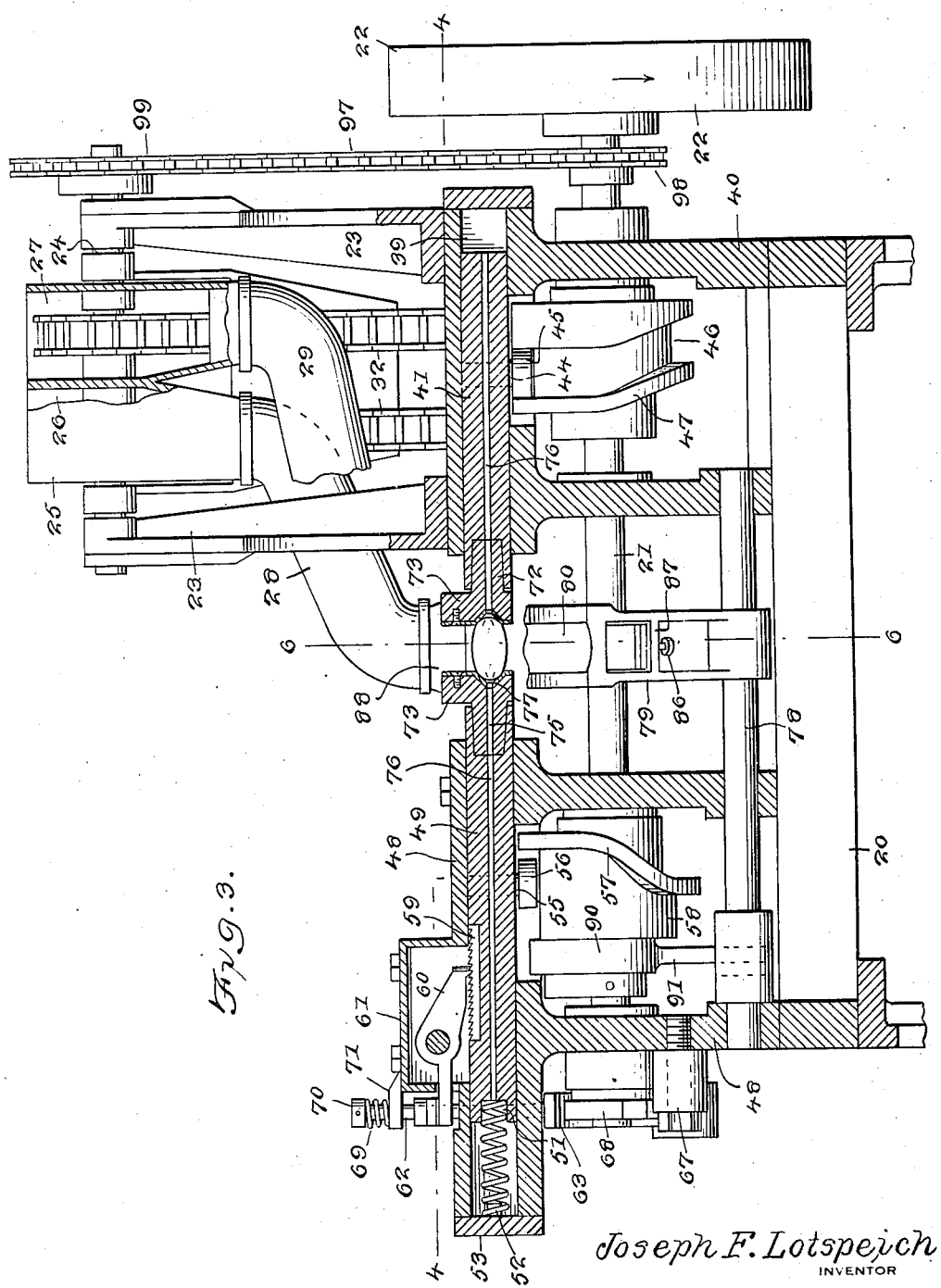

In describing my invention in detail, reference will be had to the accompanying drawings illustrating a practical adaptation of the invention, and in which Figure 1 is a side elevational view of the assembled machine, Figure 2 is a rear end elevational view of the same, Figure 3 is a longitudinal section taken on line 3—3 of Figure 2, Figure 4 is a top plan view of the machine partly in section showing a pair of nuts supported in cracking position, Figure 5 is a similar view showing the nut holding members in retracted nut releasing positions, Figure 6 is a transverse sectional view through the machine illustrating the nut positioning mechanism in inward nut depositing position, Figure 7 is a similar view showing the said mechanism in nut receiving arrangement, Figure 8 is a detail elevational view of one of the cam members of the machine, Figure 9 is a fragmentary radial section through the same, Figure 10 is a perspective view of one of the plunger members, Figure 11 is a similar view of another plunger member, and Figure 12 is an enlarged sectional view through the nut holding jaws in nut supporting position.

With reference to the drawings, wherein like characters of reference denote corresponding parts throughout the several views, 20 generally designates a frame having journalled horizontally thereon a main shaft 21 on the forward end of which is fixed a pulley 22. On the forward section of the frame 20 are mounted a pair of complementary upstanding brackets 23 formed with bearings rotatably supporting an elevated auxiliary shaft 24. The center portion of this shaft extends through a hopper housing 25 supported between the brackets 23 and divided to provide a pair of hopper chambers 26 and 27. To reduced outlets at the bottom of these chambers are connected the upper ends of a pair of downwardly directed conduits 28 and 29.

Extending laterally from the elevated frame structure is a storage receptacle or bin 30 having apertured ears 30' connecting the receptacle with the elevated shaft 24. An oblique bar 31 serves to support the bin in proper position on the frame. A pair of endless conveyor chains 32 trained over sprockets fixed on the shaft 24 serve to convey nuts from the bin 30 into the respective hopper chambers 26 and 27, the lower ends of the chains being trained over sprockets 33 fixed on a shaft 34 supported on a pair of levers 35 pivotally supported on brackets 36 attached to the bin. A pair of tension springs 37 connecting the outer ends of the levers 35 with fixed projections on the bin maintain the conveyor chains 32 under suitable tension while outer reaches of the chain are trained through the bin and travel inwardly along an inclined bottom wall 38.

In a slide chamber 39 in the top of the forward frame section 40 are mounted a pair of complementary plungers 41 in the form of elongated square shaped bars formed with inwardly projecting lugs 42 at their outer ends and at points spaced from the opposite inner ends. Between the inner sides of the plunger bars 41 and the lugs 42 thereof is mounted an elongated actuating bar 43 having fixed to its medial portion a pin 44 depending from the said bar and having a roller 45 rotatably fitted on its lower end. This roller is disposed to engage the groove 46 of a cam 47 fixed on the main shaft 21, the groove being designed to reciprocate the roller together with the actuating bar so as to effect timed longitudinal and horizontal movement of the plungers 41.

In a slide forming chamber in the upper portion of an opposed complementary frame section 48 are mounted a pair of elongated square plungers 49 formed with inwardly directed lugs 50 adjacent their rear ends and provided at their rear extensions with recesses 51 engaging the inner ends of a pair of coiled compression springs 52. The outer ends of these horizontally disposed springs bear against a rear cross bar 53 so that they yieldingly urge the bars 49 inwardly of the frame. These rear plunger bars 49 are slidably actuated in one direction, that is against the action of the springs 52, through the medium of an elongated square slide head 54 mounted between the bars 49 and engageable with the lugs 50 thereof. This member 54 carries a pin 55 depending therebelow through a slot in the frame and carrying a roller 56 engageable by a cam rib 57 on a cam member 58 fixed on the rear portion of the main shaft 21.

Each of the plunger bars 49 carries, on the top thereof, a ratchet bar section 59 having transversely disposed rack teeth engageable with the forward toothed portions of pawls 60. The pawls 60 for the respective plunger bars are enclosed in a housing 61 and have their rear portions fastened to an upstanding rod 62. This rod is formed on an approximately semicircular shaped arm 63 having its lower portion connected with a stub shaft 64 carrying a roller 65. The shaft 64 is supported on the arcuate crank arm 66 pivotally connected with the frame through a pivot member 67. The roller 65, disposed in a vertical plane, is operatively associated with a cam 68 secured on the rear extremity of the main shaft 21. About the upper portion of the rod 62 is sleeved a coiled compression spring 69 maintained under compression between a collar 70 secured on the upper end of the rod and a bearing 71 fastened to the housing 61. Thus, the spring 69 tends to yieldingly elevate the rod 62 and the pawls 60 carried thereby.

In sockets formed in the inner ends of the respective plunger bars 41 and 49 are removably fitted holder jaws 72 each embodying a vertically elongated rectangular shaped head 73 and a tapered shank 74 projecting laterally from the lower portion of the head for detachable connection with a correspondingly tapered socket in each of the plunger bars. As shown to advantage at Figures 3 and 12, each of the jaws is provided with a throughbore 75 adapted to assume alignment with similar bores 76 formed through the plunger bars. In the inner face of each jaw 72, adjacent the lower portion, is formed a conical recess 77 shaped to effectively engage the end formation of a pecan nut. This recess and the entire front face portion of each jaw 72 is covered by a strip of wear material such as that commercially known as "stellite."

On each of a pair of transversely spaced shafts 78 journalled longitudinally in the lower portion of the frame is fixed a member 79 for carrying and positioning the nuts for cracking, said member extending radially from the shafts and having a sector-shaped configuration transversely of the shaft and a U-shaped formation longitudinally of the shaft. Thus, the members 79 are in the form of U-shaped arms formed with arcuate segments 80 at their outer ends and having the inner edge portion of each of the exterior segments bevelled to form an inclined carrying face 81. Within the upper portion of each arm 79 is pivotally supported a holder element 82 in the form of a flat tongue pivotally connected with the arm by a transversely extending pivot pin 83 and having an inward extension 84 carrying a weight plate 85 yieldingly maintaining the inner end of the said lever downwardly against a set screw 86 threaded through a web 87 fixed on the arm. The outwardly projecting tongue portion 82 of this lever mechanism is normally held in an inclined position cooperating with the bevelled end face 81 of the arm to form a tapered notch designed to receive a pecan nut in longitudinal arrangement therein and to release the same upon application of the holding jaws.

As will be noted, the respective conduits 28 and 29 carry the nuts from the hopper chambers 26 and 27 to a delivery spout 88 at the bottom of each of the conduits. As clearly shown at Figures 6 and 7, the spouts 88 open downwardly and have their opposed side walls shaped to provide a diminishing taper toward the lower end of the spout to feed the nuts singly through the discharge opening in a position for proper seating on the carrying notch structure of the respective arms 79.

Rearwardly of the cam 58 the main shaft 21 has fixed thereon an eccentric disk 89 carrying thereabout a strap 90 formed with a depending bar 91. The lower end of the bar is connected, by a pivot pin 92, to the inner overlapped ends of a pair of crank arms 93 keyed or otherwise fastened to the respective shafts 78. This eccentric mechanism is disposed to effect rocking movement of the pair of arms 79 so that during each rotation of the main shaft these arms will move from upwardly inclined outward positions arranged to receive a nut from the respective feed spout 88 to inward adjacent positions for presenting the nut to a crushing position where the nuts are engaged by the jaws of the reciprocatory plungers while the carrier arms 79 are returned to their initial nut receiving positions.

The cam member 47 functions to cause sliding movement of the jaw carrying plungers 41 through an unvarying operative stroke, while the cam 57 engages the following roller 56 in such manner as to retract the jaw carrying plungers 49 against the action of the springs 52 which yieldingly depress the plunger bars so that the jaws thereof assume nut clamping positions varying in accordance with the variation in the length or size of the nut. The pawls 60 which, in downward positions, engage the ratchets 59 carried by the plunger bars act to releasably hold the said plunger bars in advanced nut engaging positions.

As shown to advantage at Figure 8, the cam wheel 47 carries thereon a disk 94 formed eccentrically on one end of a stem 95 rotatably fitted in a bore in the cam wheel and adjustably fastened in position by a set screw 96. The disk 94 is adjusted to protrude into the groove 46 so as to provide an abrupt projection which, upon contact with the follower roller 45 imparts a rapid advancing thrust to the jaw carrying plungers 41, in the manner of a short rapid stroke to effectively crack the nuts without crushing or unduly mangling the same. Upon completion of the cracking action both pairs of jaw carrying plungers are retracted to release the nuts so that the same may fall into a receiving container disposed below the holding positions of the nuts.

The auxiliary elevated shaft 24 is driven in unison with the main drive shaft 21 through the medium of an endless chain 97 trained over sprockets 98 and 99 secured on the shafts 21 and 24 respectively. A pulley 22 fixed on the forward end of the main shaft 21 is adapted for connection with a suitable source of power for driving the various mechanisms of the machine.

During operation of the machine the nuts, as for instance pecans, are initially deposited in the storage receptacle or bin 30 from whence they are carried by the conveyor chains 32 to the respective chambers of the hopper. From the hopper chambers the nuts are caused to gravitate through the respective conduits 28 and 29 to the discharge or feed spouts 88. The complementary arms 79 are caused to oscillate transversely of the axes of the machine and the application of cracking force, gathering a nut at the inner notched portion of each arm when the arms are in outward feeding positions and carrying the said nut inward to a cracking position in alignment with the respective coacting jaw carrying plungers of the machine. The arms hold the pecans in inward position until the jaws of the plunger 41 are advanced to their constant holding positions and the jaws of the plungers 49 are advanced or slid inward under the impulse of the springs 52 to yieldingly engage the ends of the pair of nuts opposite those engaged by the sockets of the jaws carried by the plungers 41, at which time the respective sets of pawls 60 will lock the plungers 49 in nut holding position, so that the nuts are tightly gripped by the respective jaws. As the cam abutment forming disk 94 engages the roller 45 it subjects the plungers 41 to a rapid longitudinal inward thrust sufficient to crack the shells of the nuts. The continuing cycle of operation causes positive retraction of the plungers 41 and elevates the sets of pawls 60 to disengage the same from the ratchet inserts 59 so that the cam 57, acting against the roller 56 may retract the plungers 49 against the pressure of the springs 52. Thus, the cracked nuts are released and dropped into a suitable receiving receptacle. It is to be noted, as illustrated at Figure 6, that the oscillatory carrier arms 79 are formed so that the outer segmental portions 80 effect closure of the discharge spout 88 when the said arms are moved inward from their nut receiving positions.

It will be readily apparent that my machine provides a structure for rapidly and efficiently handling and cracking nuts and which is especially designed to simultaneously crack two nuts so as to double the output of the machine.

It is to be understood that the invention is not confined to the specific construction, arrangement or use illustrated and described and that considerable modification may be made therein within the spirit of the invention as defined by the appended claims.

I claim:

1. In a nut cracking machine, a frame, a drive shaft journalled longitudinally on the frame, a hopper mounted above the frame, an auxiliary shaft extending horizontally through the hopper, a receptacle for storing a quantity of nuts mounted adjacent the said hopper, means for conveying nuts from the said receptacle into the hopper, a pair of discharge spouts disposed at opposed sides of the frame, a pair of conduits for conducting nuts from the hopper to the said spouts, jaw members operable to releasably engage a pair of nuts mounted on the frame and operable by the drive shaft thereof, and means intermittently operable to carry nuts from the discharge spouts to positions in alignment with the said nut gripping jaws.

2. In a nut cracking machine having means for gripping a nut in cracking position and a spout having a feed opening at the bottom toward which nuts may gravitate through the spout, a pivotally supported arm mounted to oscillate transversely of the spout opening and nut gripping means, an arcuate member on the outer end of the arm adapted to close the feed opening when the arm moves toward and attains a position for disposing a nut in gripping arrangement, and a pivoted member mounted on the arm cooperative with an edge of the arcuate member to provide a notch for receiving and carrying a nut to the gripping means tiltable upon movement of the arm toward nut receiving position to release the gripped nut.

JOSEPH F. LOTSPEICH.